United States Patent [19]
Jauss

[11] 3,887,127
[45] June 3, 1975

[54] METHOD OF AND CONTROL CIRCUIT FOR ADMIXING AIR

[75] Inventor: Fritz Jauss, Schonaich, Germany

[73] Assignee: Zentra Albert Burkle Kommanditgesellschaft, Schonaich, Germany

[22] Filed: Oct. 2, 1973

[21] Appl. No.: 402,922

[30] Foreign Application Priority Data
Oct. 2, 1972 Germany............................ 2248284

[52] U.S. Cl...................... 236/91; 165/16; 165/26; 236/49
[51] Int. Cl............................................ F24f 11/00
[58] Field of Search.......... 165/16, 26, 91; 236/1 C, 236/49

[56] References Cited
UNITED STATES PATENTS
| | | | |
|---|---|---|---|
| 2,209,787 | 7/1940 | Miller | 165/16 |
| 2,224,407 | 12/1940 | Passur | 236/49 X |
| 3,739,980 | 6/1973 | Andersen | 236/49 |

*Primary Examiner*—William E. Wayner
*Attorney, Agent, or Firm*—Edwin E. Greigg

[57] ABSTRACT

An electrical control circuit, which is free of any switching device for changing from winter operation to summer operation. A first channel and a second channel are provided respectively for summer and winter operation. The first channel and the second channel are constantly operational. The first channel develops a changing output signal in dependence on the temperature or heat content of the outside air or the mixture air only below a first onset point. The second channel develops a changing output signal in dependence on the temperature or heat content of the outside air or the mixture air only above a second onset point. The output signals from the two channels are supplied to a summation circuit, the output from which determines the position of an adjustable setting mechanism through which outside air may enter. A method for changing the onset point of the characteristic curve which determines the start of variable throttling of outside air is characterized by maintaining a substantially constant difference between the temperature of exhaust air and the temperature of the outside air or the mixture air.

29 Claims, 7 Drawing Figures

METHOD OF AND CONTROL CIRCUIT FOR ADMIXING AIR

BACKGROUND OF THE INVENTION

This invention relates to a method of and an electric control circuit for generating signals for the admixing of outside air to internally recirculating air. The invention relates, more particularly, to an electric control circuit for the generation of signals which influence the position of a control member for regulating the admixture of outside air to the internally recirculating air in ventilation or air-conditioning plants. During winter operation, the outside air portion added to the mixture, beginning upon the occurrence of a predetermined first air temperature (onset point) is made smaller, the lower the outside or mixture air temperature becomes. During summer operation, the outside air portion added to the mixture, beginning upon the occurrence of a predetermined second air temperature (onset point) is made smaller, the higher the outside or mixture air temperature becomes. Devices are provided for adjusting the two predetermined onset points and for automatic switching between summer and winter operation.

In known circuits of this kind, the switching from winter operation to summer operation and back is effected by so-called change-over thermostats which have switches assigned to them, these switches being activated in dependence on the outside air temperature as sensed by the thermostats. Such circuits always have been composed of one single channel at whose input there is connected a potentiometer determining the first onset point or the second onset point. Because the temperature-dependent adjustment during summer operation is in the opposite direction to that for winter operation, when the air temperature changes in the same direction (sense), an additional switching device, also activated by the selected change-over thermostat, must be disposed between the temperature sensitive control signal generating circuits and the setting device; this additional switching device effects the required exchange of the setting directions for the setting device. What is further disadvantageous is that, in known circuits, the slope of the two inclined portions of the temperature-dependent characteristic curve of which one inclined portion is assigned to the winter operation and the other inclined portion is assigned to summer operation, cannot be changed by pivoting the appropriate inclined portions about their respective onset points; rather, each inclined portion is pivoted about a center set point located approximately in the middle of the respective inclined portion. A consequence of this is that the distance between the two onset points changes when the slope of the above-mentioned branches of the characteristic curve is changed. It would be considerably more favorable if the inclined portions of the characteristic curve could be pivoted about their respective fixed assigned onset points in order to change their slope.

SUMMARY OF THE INVENTION

It is an object of the present invention to provide an electrical control circuit for the generation of signals which influence the position of a control member for regulating the admixing of air and which is free of any special thermostatically controlled switching device for changing from winter to summer operation and from summer to winter operation.

It is another object of the present invention to provide an electrical control circuit for the generation of signals which influence the position of a control member for regulating the admixing of air and which is constructionally simple and operationally reliable.

It is an additional object of the present invention to provide an electrical control circuit for the generation of signals which influence the position of a control member for regulating the admixing of air and which has an operational characteristic curve which exhibits two fixed onset points leading to inclined portions, having opposite slopes, connected by a substantially flat portion.

It is a further object of the present invention to provide an electrical control circuit for the generation of signals which influence the position of a control member for regulating the admixing of air and which has an operational characteristic curve which exhibits two fixed onset points connected by a substantially flat portion and leading to respective inclined portions having opposite slopes which can be adjusted in a simple manner.

It is yet another object of the present invention to provide a method for changing the onset point of the characteristic curve, which determines the beginning of variable throttling of outside air in a ventilation or air conditioning system, in dependence on the temperature of the exhaust air.

The foregoing objects, as well as others which are to become apparent from the text below, are achieved by providing an electric control circuit including means which sense an air heat-related parameter for generation of signals which influence position of a control member which regulates the admixing of outside air into recirculating air in ventilation or air conditioning systems where, during winter operation, the outside portion of the mixture, starting with a first predetermined onset point, is smaller, the lower is the air heat-related sensed parameter; and where, during summer operation, the outside air portion of the mixture, starting with a second predetermined onset point, is smaller, the higher is the air heat-related sensed parameter. The electric control circuit comprises a first channel for winter operation and a second channel for summer operation, each of the channels being constantly operational. The first channel is responsive to the sensed heat-related parameter only below the first onset point for providing a first output signal, and the second channel is responsive to the sensed heat-related parameter only above the second onset point for providing a second output signal. Means responsive to the output signal from the first channel and the second channel are provided for adjusting the position of the control member. The circuit function automatically changes between winter and summer operational modes as required without aid from any special switching device.

According to the present invention, an electrical circuit of the kind described above is provided. The thermostatically controlled switching devices for switching between winter and summer operation previously required are eliminated. A first channel is provided for winter operation and a second channel is provided for summer operation, both channels being constantly operational. The output of the first channel depends on a first onset point and on either the outside air or mixture air temperature or heat content. The output of the second channel depends on a second onset point and on either the outside air or mixture air temperature or heat content. While both channels are constantly operational, they are operationally arranged in such a way that the output signal from the first channel changes in dependence on temperature or sensed heat content only below the first onset point and the output signal from the second channel temperature-dependently or heat-dependently only above the second onset point. Preferably, both channel output signals are supplied to a summation circuit whose output signal determines the position of the setting mechanism which governs intake of outside air.

The control circuit has the advantage, among others, that it requires no switching means for switching from summer to winter operation and back because the required mode of operation for summer and winter conditions adjusts itself automatically in dependence on the outside or mixture air temperature or heat content. The omission of the change-over thermostat also results in increased operational reliability. Further, it makes possible a very exact control or regulation according to the desired characteristic curve. Furthermore, in a simple way, one can achieve that no switching means for the change-over for the setting directions of the setting device are required, by developing the two channels in such a way that their outputs determine the correct setting direction of the setting mechanism without further action.

It is to be understood that the invention can be embodied in numerous different embodiments.

In a preferred embodiment it is provided that there is disposed one common temperature sensor for both channels for the purpose of sensing the outside or mixture air temperature. A respective one-way rectifier circuit is provided in each channel, the two rectifier circuits having an opposed rectifying effect. The voltage in one of the two channels is inverted; preferably it is the output voltage from one of the two rectifier circuits which is inverted.

A separate temperature sensor for the sensing of the outside or mixture air temperature, in many cases, can be provided advantageously in each channel. These sensors are temperature dependent resistors and a one-way rectification circuit is assigned to each channel.

In both cases, the rectifier circuits have the purpose to achieve that, during the winter operation, only the output of the first channel changes and, during summer operation, only the output of the second channel changes, preferably beginning with a zero voltage level. Instead of such rectifier circuits it is possible, in many cases, suitably to provide other electrical or electronic circuits which have the same effect, preferably threshold circuits, limiter circuits or the like.

The summation circuit can have any suitable embodiment; preferably it is an additive circuit. Its specific design depends on the specific design of the channels. Depending on their design, it can also be, in some cases, a subtractive circuit.

In order to reduce the required cooling power during summer operation, it is provided, according to a preferred aspect of the present invention, that the second onset point is automatically changed in dependence on the exhaust air temperature. This feature, which is the salient characteristic of the method, can be effected by the specific circuit embodiments described herein and can also be accomplished using different circuits.

In general, there is thus provided a method for changing the onset point of the characteristic curve which determines beginning of the variable throttling of the outside air supply during cooling operation, and according to which, in ventilation or air conditioning systems or apparatus, the supply of outside air is influenced in dependence of the outside or mixture air temperature. This method is characterized in that this onset point is automatically changed in dependence of the temperature of the exhaust air, preferably by maintaining an approximately constant temperature difference between the outside air and the exhaust. This method is also suitable in apparatus and in systems which serve exclusively for space cooling.

DETAILED DESCRIPTION OF THE PREFERRED EMBODIMENTS

Figure 1:
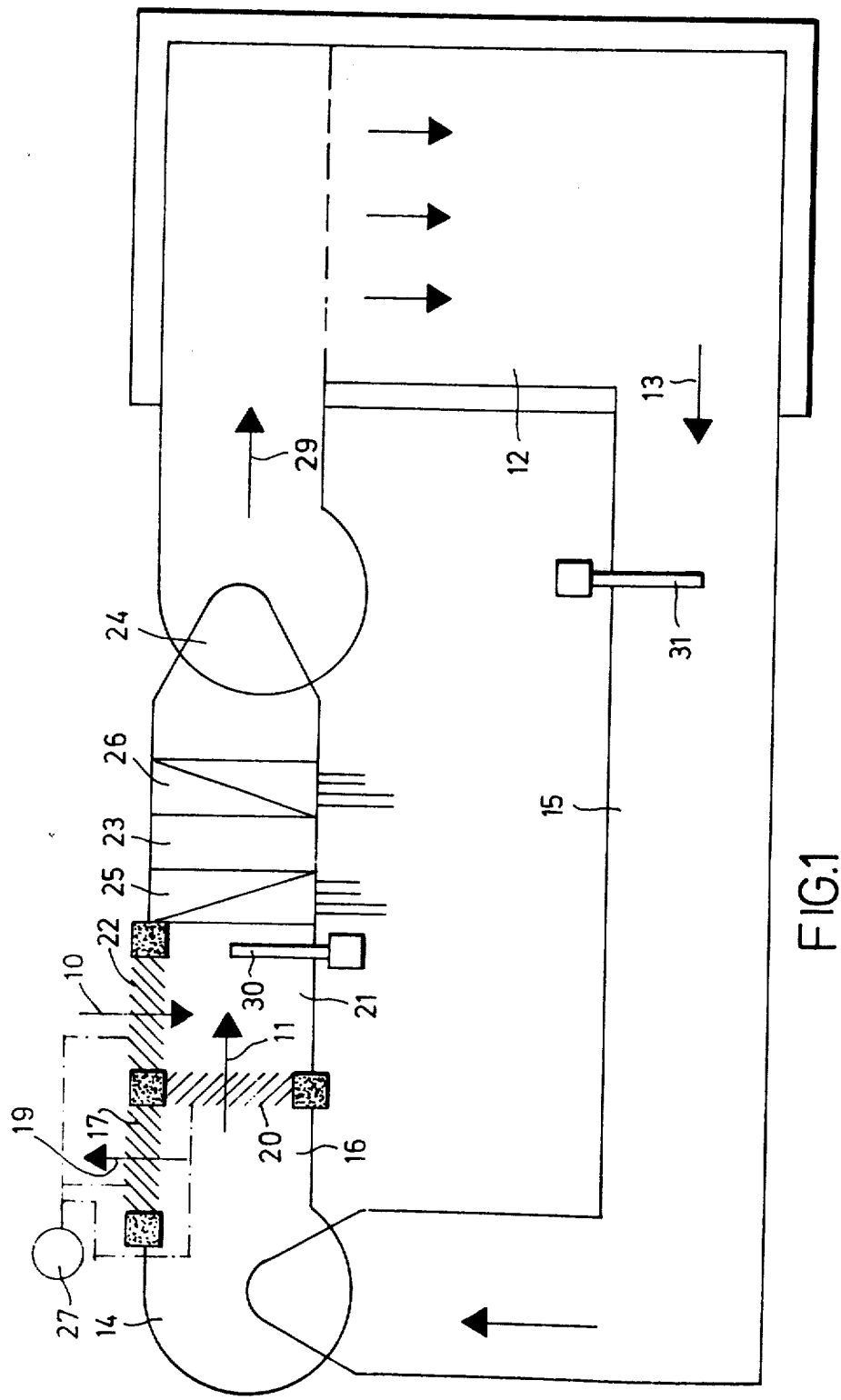
FIG. 1 is a schematic representation of an exemplary embodiment of a ventilation system.

FIG. 1 shows a simple exemplary embodiment of a ventilation system in schematic representation, which makes it possible to reduce as much as feasible the energy requirement of spaces to be heated and cooled by mixing outside air (arrow 10) with recirculating air (arrow 11) in order to increase the economy of the system. In this system, the portion of outside air, during winter operation and for optimum economy, can be the larger the higher the outside air temperature is. During summer operation the portion of outside air must be decreased with increasing outside air temperature in order to conserve cooling energy. For this reason, the temperature of the mixed air is adapted to the requirements of the room 12 or other ventilated control spaces by admixture of recirculating air and the aspirated outside air.

In the installation shown, a room, either cooled or heataed, is designated by the numeral 12. From this room exhaust air (arrow 13) is continuously aspirated by means of a ventilator (fan) 14 through an exhaust channel 15. Downstream from the ventilator 14 a chamber 16, having an outlet, is disposed. The chamber 16 is variably throttled by flaps 17 which serve for the expulsion of discharge air (arrow 19). The chamber 16 has another outlet, throttled by flaps 20, which outlet serves for passing the recirculating portion of the exhaust air. The recirculating air flows into a mixing chamber 21 which also has an inlet which is variably throttled by flaps 22 and admits outside air, so that in the mixing chamber 21 recirculating air and outside air are mixed together to form mixed air. This mixed air flows into a channel 23 in which heat exchangers 25 and 26 are disposed for heating and cooling. The mixed air, which is either warmed or cooled by the heat exchangers 25 and 26, is blown into the room 12 by means of a ventilator (fan) 24 and serves as inlet air (arrow 29). The flaps 17, 20, and 22 can be adjusted, in a conventional fashion by a single setting motor 27 which can be, for example, an electric motor, a pneumatic cylinder or the like.

The control of the flaps 17, 20 and 22 and, therefore, also the fixing of the ratio of outside air quantity of recirculating air quantity can take place either in dependence on the outside air temperature of its heat content, or on the temperature of the mixed air or its heat content. In the exemplary embodiment shown, the mixed air temperature is sensed by a temperature sensor 30 positioned in the chamber 21. Furthermore, an exhaust temperature sensor 31 is disposed in the exhaust channel 15, its task is to be explained below in connection with the circuit of FIG. 5 according to a preferred embodiment of the present invention.

Figure 2:
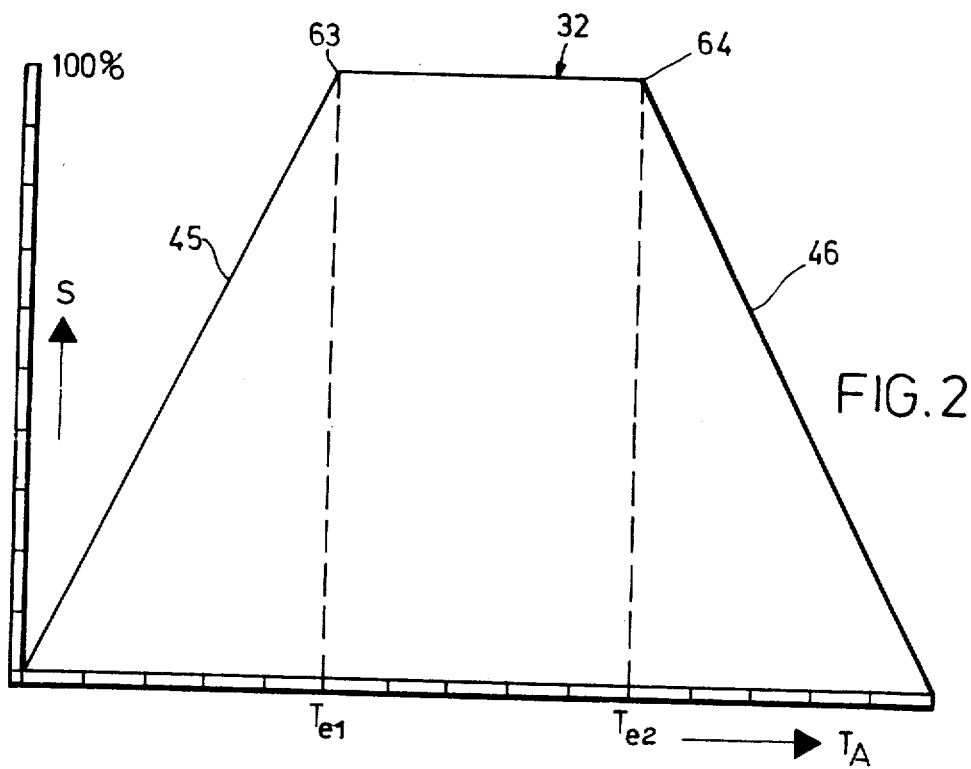
FIG. 2 is a characteristic curve of a ventilation system, showing percentage of flap opening as a function of temperature.
Figure 3:
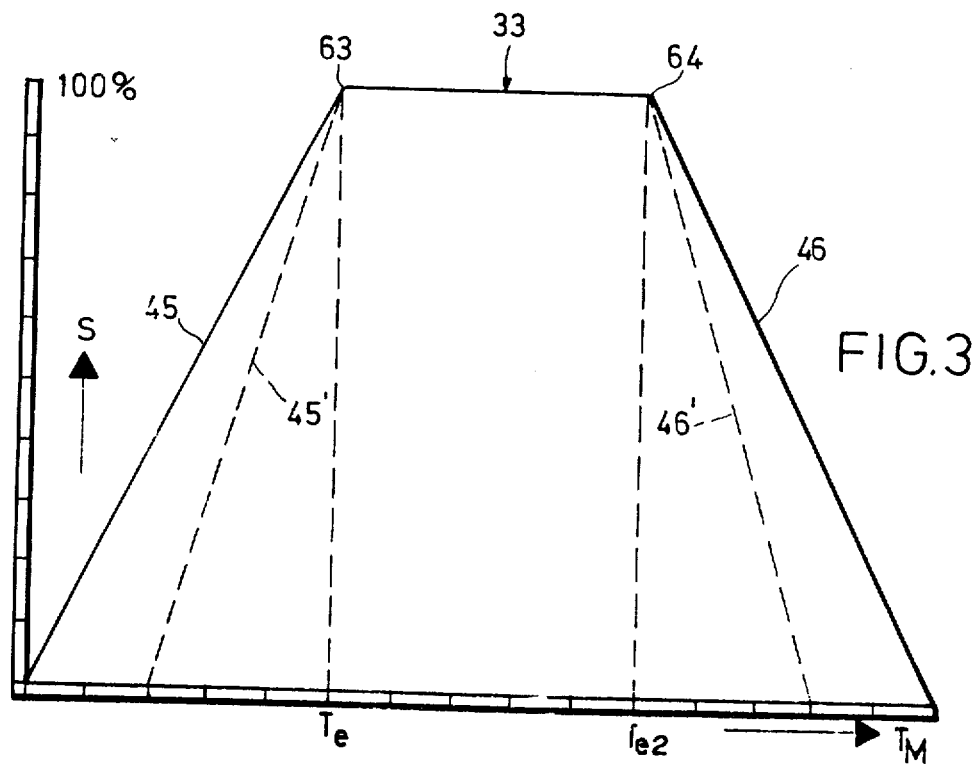
FIG. 3 is a characteristic curve of a ventilation system, the curve showing percentage of flap opening as a function of temperature and having variable slope portions.

The instrumentalities which serve to control the mixed air temperature or to control the ratio of outside air to recirculated air which is dependent on the temperature of the outside air, must perform this regulation or control according to desired operational characteristic curves. One such operational characteristic curve is illustrated in FIG. 2. The regulation or control is accomplished in such a way that only below a predetermined onset point (temperature) $T_{e1}$ and above a second onset point (temperature) $T_{e2}$, the portion of the outside air is changed. In the temperature range between the two onset points $T_{e2}$ and $T_{e1}$ the portion of outside air present in the mixed air is that a maximum or exclusively outside air and no recirculating air at all is admitted into the chamber 12. If the outside temperature $T_A$ or the mixed air temperature $T_M$, depending on which of these parameters had been selected for controlling, falls below the first onset point $T_{e1}$, then, for decreasing outside air temperature, the portion of outside air in the mixed air is uniformly or, in some cases, non-uniformly reduced, where, in general, it is suitable to correspondingly increase the recirculating portion of air in order to admit to the room 12 constant air quantities with respect to time for all operation conditions which may occur. If the outside air temperature $T_A$ or the mixed air temperature $T_M$ exceeds the second onset point $T_{e2}$, then, for increasing temperature, the outside air portion is also uniformly or non-uniformly reduced and, in this case as well, it is suitable to increase the recirculating air portion, preferably such that also constant air quantities are admitted to the chamber per unit time. FIG. 2 shows an example of such a characteristic curve 32 for the case in which the flaps 22 are adjusted in dependence on the outside air temperature. The ordinate of the curve corresponds to the set point S of the flaps 22. The position "100%" corresponds to the largest open position. The abscissa of the curve represents outside air temperature $T_A$. The diagram of FIG. 3 shows a characteristic curve 33, in which the adjustment of the flaps 22 occurs in dependence on the mixed air temperature $T_M$, shown as the abscissa. Here again the ordinate of the curve corresponds to the set point S of the flaps 22. The two onset points $T_{e1}$ and $T_{e2}$, therefore, define between them a temperature range in which the position of the flaps 22 is not changed, the flaps 22 being normally in their widest opened position.

It is possible to provide in a way not further shown, but in known fashion, devices for the adjustment of the air humidity, the cleaning of the air or the like.

FIG. 1 illustrates only a particularly simple ventilating installation. The present invention is usable in such an installation and also in ventilating and air conditioning installations that are developed differently, including those of high complexity.

Further, the present invention is usable for both the cases where either the admixture of outside air occurs in dependence on outside temperature or where the temperature of the air in a mixture chamber is regulated.

In FIGS. 4 to 7, preferred exemplary embodiments of electrical control circuits according to the present invention are illustrated, corresponding parts in the various circuits being provided with the same reference numerals.

Figure 4:
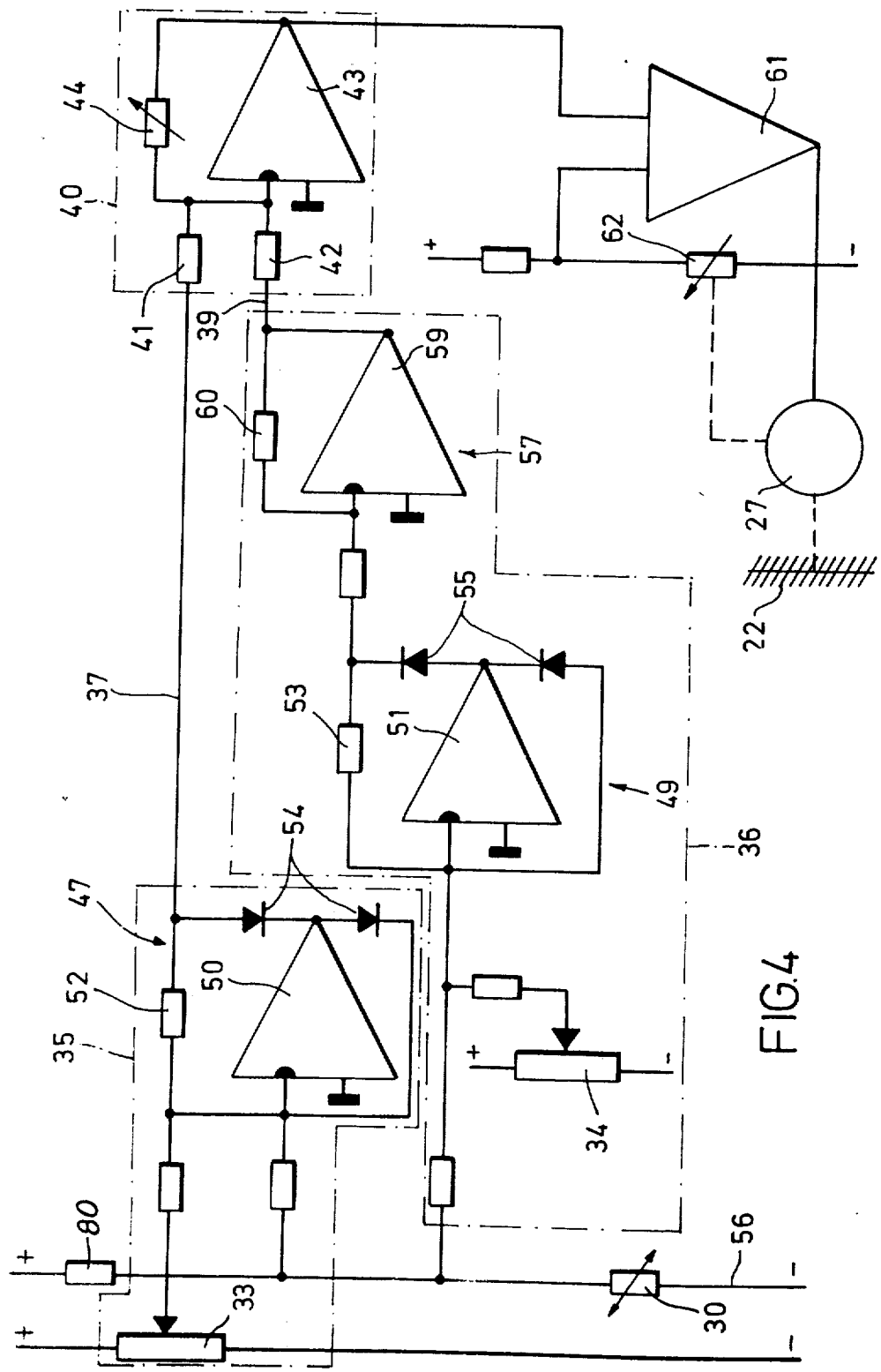
FIGS. 4–7 are schematic circuit diagrams of preferred exemplary embodiments of electrical control circuits according to the present invention.

The electrical control circuit shown in FIG. 4 has a first potentiometer 22 for adjusting the first onset point $T_{e1}$ and a second potentiometer 34 for adjusting the second onset point $T_{e2}$. Each of the potentiometers 33, 34 is assigned to its own channel so that two parallel channels 35 and 36 are present whose respective signal output connections 37, 39 are coupled to respective inputs of the summation circuit 40. The summation circuit 40 includes two input resistors 41, 42, and operational amplifier 43 and a feedback branch including an adjustable resistor 44 for the mutual adjustment of the slopes of the inclined portions 45, 46 of the characteristic curve (FIGS. 2, 3).

Each of the two channels 35, 36 is provided with a respective rectifier circuit 47, 49 which includes respectively one of two identically constructed operational amplifiers 50, 51. Each of the operational amplifiers 50, 51 has a respective feedback resistor 52, 53 and each has respectively two diodes 54, 55 which are connected in the manner shown, the cutoff direction of the diodes 54 of the first rectifying circuit 47 being opposite to the cutoff direction of the diodes 55 of the second rectifying circuit. Thus, as illustrated, the two rectifying circuits have outputs of opposite polarity. To the inputs of the two operational amplifiers 50, 51 is connected a temperature dependent voltage source which is formed by a current carrying branch 56 which includes a fixed resistor 80 and a temperature dependent NTC resistor 30. This latter resistor 30 forms a temperature sensor which, in the exemplary embodiment of FIG. 1, is the temperature sensor 30 which probes the temperature in the mixture chamber. This temperature probe can also be used as the outside temperature probe. In the first case, the described control circuit results in a regulation of the mixed air temperature along characteristic curves as are shown in FIG. 3 in an example. In the second case, there results a control of the outside air portion of the mixed air in dependence on the outside air temperature and, therefore, also an influence on the mixed air temperature along characteristic lines as are shown in FIG. 2 in an example.

The potential occurring at the signal output connection 37 of the first channel 35 is either zero with respect to ground or is negative in the shown control circuit. The potential occurring at the signal output of the rectifier circuit 49 of the second channel 36 is either zero with respect to ground or is positive. The summing network in this exemplary embodiment is an additive circuit. In order to generate the characteristic curve of FIG. 2 or 3, it is intended that only zero or negative potentials appear at the inputs of the summation circuit 40 in order to make superfluous an exchange of the setting direction of the setting motor by means of separate switches. For this reason, an inverting circuit 57 is provided in the second channel 36 between the rectifying circuit 49 and the summing circuit 40; this inverting circuit has an inverter 59 to which is assigned a conventional feedback path which includes a resistor 60. The output signal from the summing circuit 40 is fed to one input of an amplifier 61 which also has a second input supplied by a position indicator 62, shown as a variable resistor, and which generates a signal proportional to the instantaneous position of a setting motor 27 to which it is mechanically coupled. The position indicator 62 is moved by the setting motor in dependence of its own position, where preferably a rigid coupling exists suitably between the setting motor 27 and the position indicator 62.

The power supplied to the control circuit in the exemplary embodiment of FIG. 4 is direct current. However, if desired, alternating current can be provided. In this case, the rectifier circuits 47, 49 would have to be made phase-selective.

The control circuit of FIG. 4 has, furthermore, a number of resistors which are not designated by numerals. These resistors are conventionally connected in circuit and need not be explained in detail.

The operation and function of the circuit of FIG. 4 is as stated below. The desired onset points are set by manipulating the wipers of the potentiometer 33, 34. The first onset point, for example, can lie between 0° C and 20° C and the second onset point can lie between 10° C and 30° C. The first onset point is always set at values which are equal to or especially suitably lower than the second onset point. For example, the first onset point may be 10° C and the second onset point 20° C.

The temperature probe 30 either senses the outside temperature $T_A$, i.e., the temperature of the outside air, or it senses the temperature of mixed air $T_M$. As long as the sensed temperature is lower than the temperature assigned to the first onset point, the output signal level of the rectifying network 47 is negative and is proportional to $T_{e1} - T_A$ or $T_{e1} - T_M$. This output signal, with respect to ground, becomes zero when the first onset point is reached and remains constantly zero during all temperatures, as sensed by the temperature probe 30, which lie above the first onset point. If the temperature probe 30 senses the temperature $T_M$ of the mixed air, this behavior is achieved in that a proportional control of the mixed air temperature is provided to ensure that the proportional band produces this characteristic curve. The output signal level on the connection 39 of the second channel 36 is zero, with respect to ground, whenever the temperature sensed by the temperature probe 30 is lower than or equal to the second onset point $T_{e2}$. If the temperature sensed by the temperature probe 30 rises beyond the second onset point $T_{e2}$, than the output signal of the second channel is negative and the output potential is proportional to $T_A - T_{e2}$ or $T_M - T_{e2}$, as the case may be. If the probe 30 senses the mixed air temperature, then, here too, the behavior according to portion 46 of the characteristic curve (FIGS. 2, 3) produced by the second channel 36 is achieved by means of a proportional control.

Thus, the difference amplifier 43 receives output signals from the two channels which are proportional, over respective ranges, respectively to the difference between the first onset point temperature and the temperature of the outside or mixed air, so far as the winter channel is concerned, and to the difference between the temperature of the outside air or mixed air and the second onset point temperature, so far as the summer channel is concerned.

The output of the amplifier 43 is fed to one input of the amplifier 61 to effect a change in the quantity of air brought into the system by setting the setting motor 27 which, as indicated in FIG. 1, determines the positions of flaps 17, 20 and 22.

The amplifier 61 is designed, as part of servo-system, so that it sets the setting motor 27 in such a way that a difference voltage between the two inputs to the amplifier 61 becomes zero.

Thus, the motor 27 runs until the flaps 17, 20 and 22 take up respective relative positions whenever the difference voltage between the two inputs to the amplifier 61 becomes zero.

By means of an adjustable feedback resistor 44, the slope of the inclined characteristic portions 45, 46 of the curves 32, 33 (FIGS. 2, 3) can be adjusted simultaneously, the portions of the characteristic curve being pivoted in each case about the respective onset point assigned to them, i.e., about the points 63, 64 respectively of the characteristic curve. This has the important advantage that when the slope of the inclined portions 45, 43 of the characteristic curve 33 is changed, the predetermined onset points 63, 64 do not change. FIG. 3 shows two characteristic curve portions 45' and 46' which have been set by adjustment of the feedback resistor 44. The control circuit illustrated in FIG. 4 is particularly advantageous. It permits numerous variants. The same operational technique can also be achieved by other control circuits of different construction.

If individual adjustment of the inclined portions 45, 46 of the characteristic curves shown in FIGS. 2 and 3 are desired, this can, for example, be achieved by providing that either or both of the two feedback resistors 52, 53 be made variable.

As an example of variants let it be mentioned that the inversion of the output voltage signal from one of the rectifier circuits 47, 49 can be moved to the first channel 35 or that one of the two rectifier circuits can be made self-inverting.

Because the outputs of the rectifier circuits 47 and 49, shown in FIG. 4, are zero with respect to ground, as long as they do not carry the output voltage which determines the inclined portions of the characteristic curve, the adjustment of the slope of the inclined characteristic portions 45, 46 is achieved by pivoting these portions about the respective points 63, 64 which is exceedingly suitable.

Figure 5:
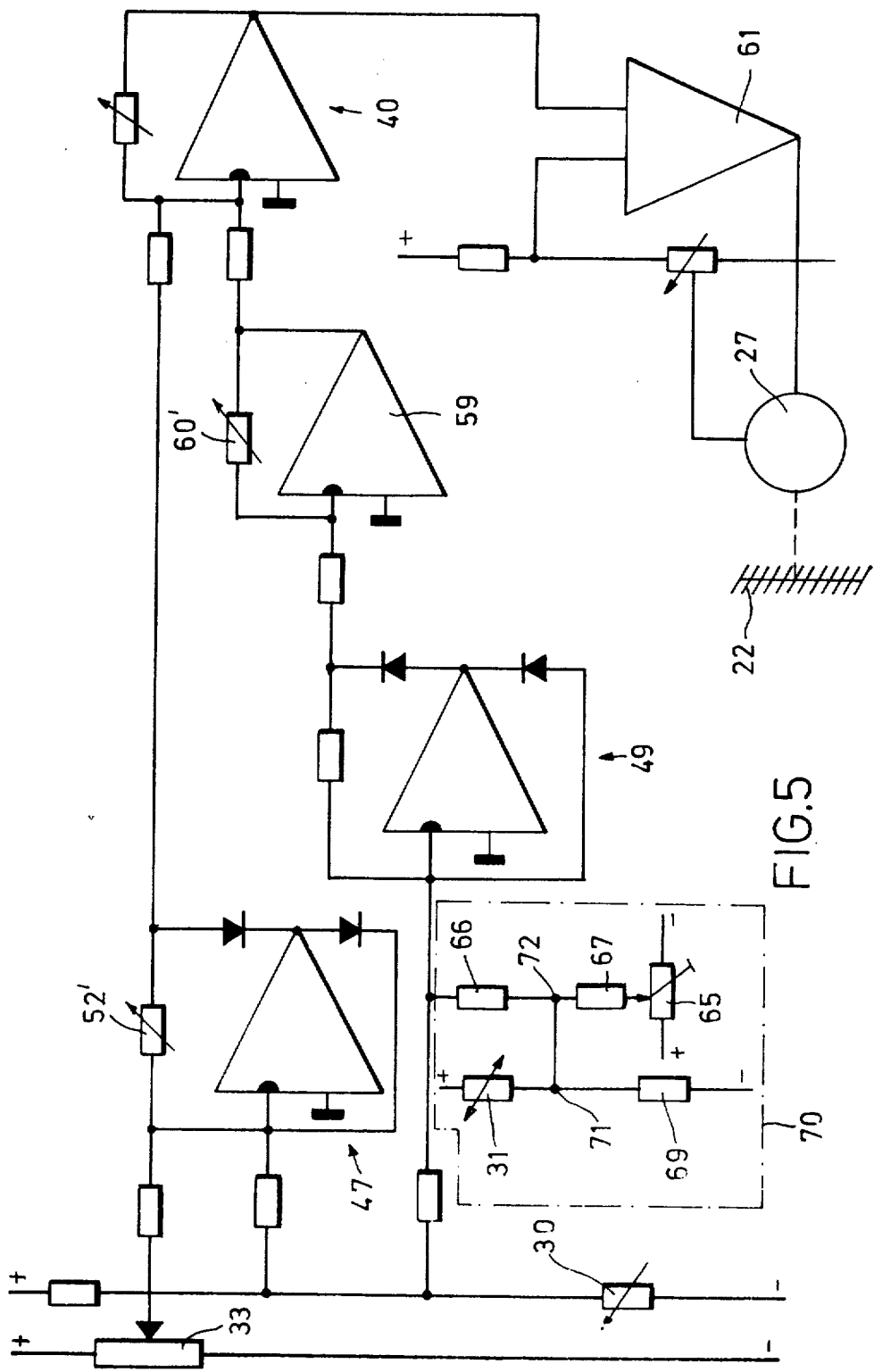

The control circuit illustrated in FIG. 5 corresponds closely to that of FIG. 4, the differences being mentioned below. The inclined characteristic curve portions 46 (FIGS. 2, 3), produced in the second channel, is adjustable independently of the setting of the inclined characteristic curve portions 45 (FIGS. 2, 3) produced by the first channel, this being accomplished by a variable resistor 60' connected in parallel to the inverter 59. The slope of the characteristic curve portion 45 can be adjusted by changing the setting of variable resistor 52'. According to the embodiment of the present invention, as shown in FIG. 5, there is further provided a circuit 70 for effecting the automatic setting of the second onset point $T_{e2}$ in dependence on exhaust air temperature. For this purpose, a temperature probe 31 is present for sensing the exhaust air temperature (see also FIG. 1). This exhaust air temperature probe 31 is, as illustrated, an NTC-resistor. Branching off from the signal input line to the second rectifying circuit 49 is a current branch leading to a tap on a potentiometer 65 connected across the positive and negative poles of a DC potential source and also containing two fixed resistors 66, 67 connected in series between the signal input connection to the rectifying circuit 49 and the tap on the potentiometer 65. A current branch containing the NTC resistor 31 and a further resistor 69 in series with it, is also connected across the positive and negative pole of the DC potential source. These two current paths are conductively interconnected between points 71 and 72. This assures that the second onset point $T_{e2}$ constantly follows the exhaust air temperature, i.e., is determined by the exhaust air temperature. Preferably it is provided, as is achieved by the shown circuit 70, that an approximately constant difference is maintained between the second onset point $T_{e2}$ and the exhaust air temperature or that, depending on the setting of the potentiometer 65, the second onset point $T_{e2}$ corresponds to the exhaust air temperature.

During summer operation, an energy saving during space cooling, and therefore a cost reduction in the economy, can take place only if the required cooling power is reduced by the admixture of recirculating air to the outside air. This can be achieved, however, only if the exhaust temperature is lower than the outside temperature. It is, therefore, suitable to adjust the second onset point $T_{e2}$ in dependence on the exhaust temperature because in this way the cooling power can be held smaller than would be the case with a constant setting of the second onset point $T_{e2}$ where the conditions are, of course, to be picked so that sufficient outside air is admixed to the recirculating air. When the probe 30 senses the outside air temperature, it is sensible to adjust the second onset point $T_{e2}$ automatically to the prevailing exhaust air temperature or its vicinity. If the temperature of the mixed air is regulated, then it is suitable for the achievement of favorable mixture ratios of outside air to recirculating air, to make the second onset point $T_{e2}$ follow the exhaust air temperature at somewhat above, e.g., approximately 2° above the exhaust air temperature.

Although as a practical matter, the exhaust air temperature may fluctuate within wide limits, satisfactory control can be achieved during all operational conditions which may occur by means of the circuit 70 in which, by use of the potentiometer 65, the desired difference between the second onset point $T_{e2}$ and the exhaust air temperature may be adjusted. In some cases, it can be suitable for this purpose, to set the exhaust air temperature somewhat higher than the second onset point $T_{e2}$, but this may be done only so far that a control regulation in the reverse sense does not occur.

In some cases, it can also be suitable to automatically adjust the first onset point $T_{e1}$ in dependence on the exhaust air temperature.

Figure 6:
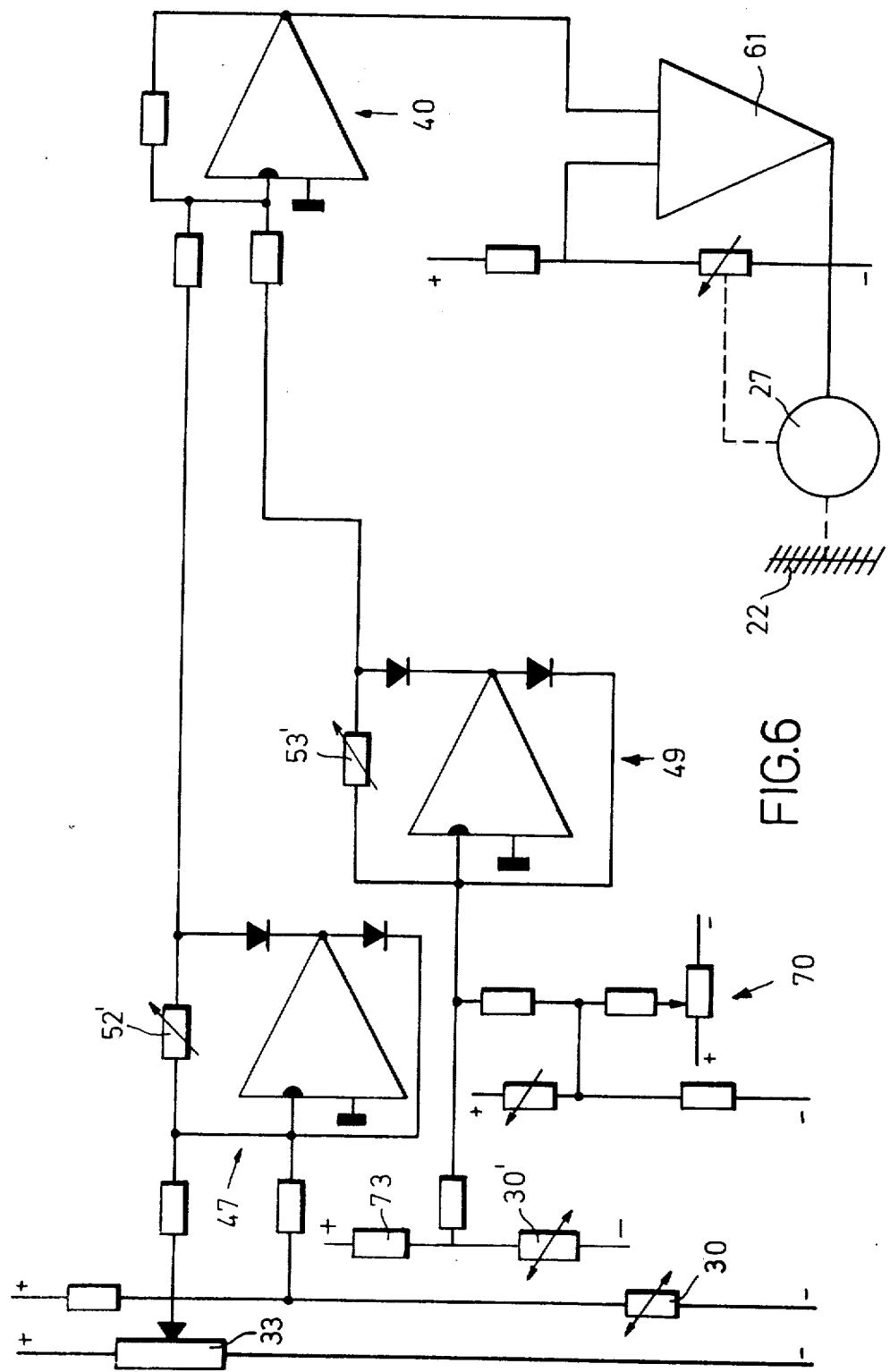

FIG. 6 illustrates an electric control circuit which is different from that shown in FIG. 5 in that the second channel has its own temperature sensing probe resistor 30' for sensing the outside temperature or the mixture chamber temperature and where this probe 30' is a PTC-resistor. It can also be an NTC-resistor if its position were interchanged with that of a constant resistance 73, which is connected in series with it across the DC potential source.

The rectifying circuit 49 of the second channel is so designed that at its output, only a voltage of the same polarity occurs as occurs at the output of the rectifying circuit 47 so that the inverter circuit 57, shown in FIG. 5, is unnecessary in the control circuit arrangement of FIG. 6.

By means of variable resistors 52', 53' the slope of the characteristic curve portions 45, 46 (FIGS. 2, 3) can be adjusted independently of one another.

Figure 7:
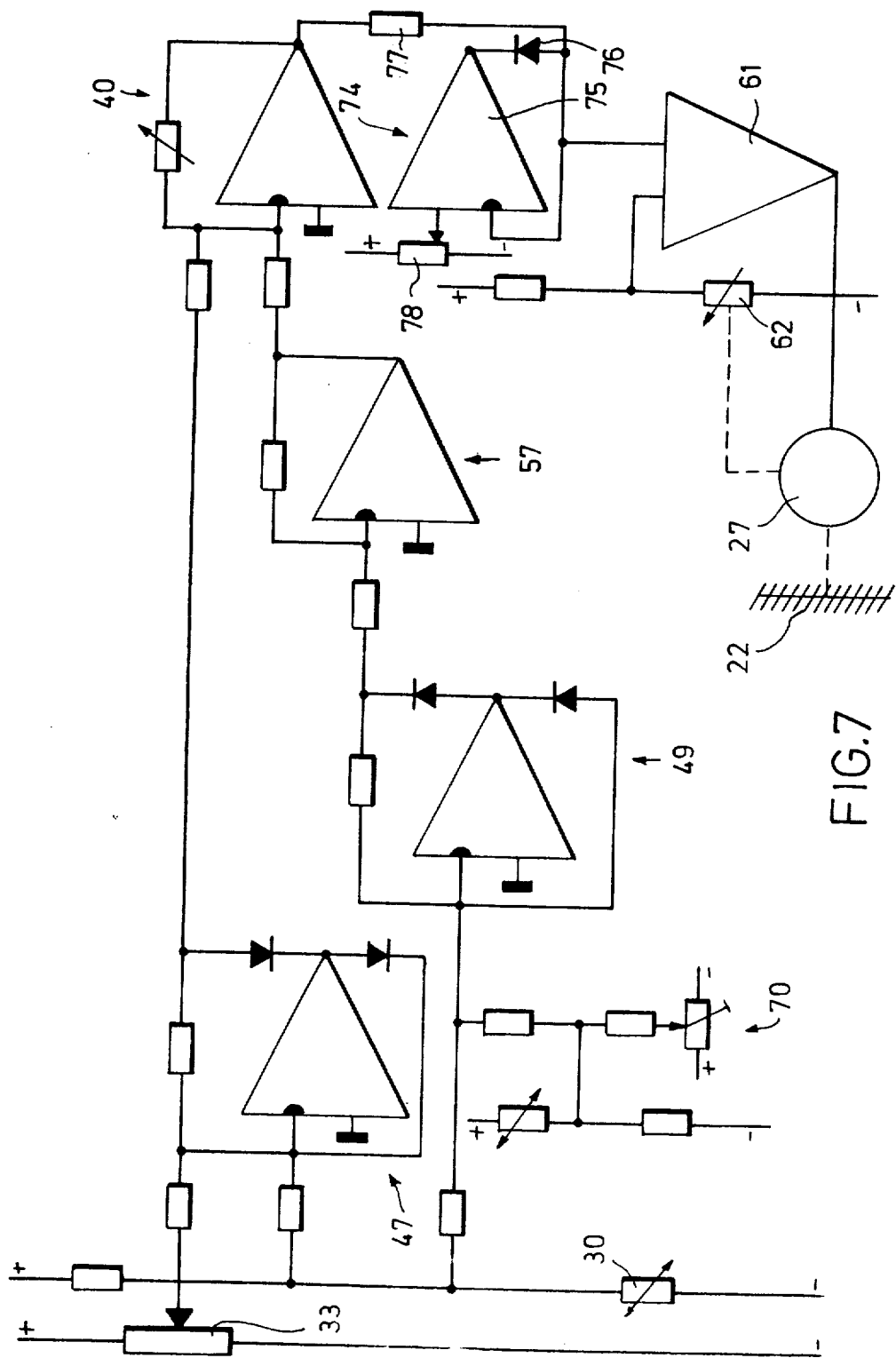

FIG. 7 illustrates a control circuit arrangement which corresponds to a variant of the control circuit scheme of FIG. 5 and is differentiated from it in that it has a limiting circuit 74 for limiting the output of the summation circuit 40 to an adjustable minimum and, therefore, acts for the adjustment of one of the limiting positions of the setting motor 27. This limiting circuit includes an operation amplifier 75 with an associated diode 76 connected between the output terminal of the amplifier 75 and one of its input terminals. One input of the operational amplifier 75 is supplied, through a resistor 77, with the output signal from the summation circuit 40. The second input of the operational amplifier is connected to the tap of a potentiometer 78 by means of which the corresponding limiting position of the setting motor 27 is adjustable.

By incorporating the limiting circuit 74 into the circuit, it is achieved that the flaps 22 which throttle the inlet for the outside air are not completely closed so that in all operational conditions which can occur, there is always some outside air admixed to the recirculating air, and where the minimum portion of outside air in the circulating air can be adjusted by means of the potentiometer 78.

If the diode 76 in the circuit of FIG. 7 is connected with opposite polarity to that shown, then the portion of outside air can be limited to an upper value settable by the potentiometer 78 by means of this limiting circuit. If this latter limiting circuit is combined with the limiting circuit shown in FIG. 7, then the outside air portion can be limited adjustably upwardly as well as downwardly.

In the above, the invention has been described in connection with one or several temperature probes for sensing the outside temperature of the mixed air temperature. These probes can in many cases be advantageously developed so that this temperature contributes to the probe output signal only as one among several parameters. So in many cases the probe or a probe device taking its place can advantageously be developed so that the resulting probe signal is a measure for the effective heat content of the air (outside air or mixed air), i.e., that the humidity of the appropriate air also contributes to the output signal of the probe or of the probe device. If a probe is provided for the exhaust air temperature, the same applied to this probe, i.e., it can be suitably developed or be replaced by a probe device which senses the heat content of the exhaust air.

The preferred circuit arrangements shown in the drawing indicates that the outputs of the two channels, such as 35, 36, are connected to the inputs of a summation circuit 40. This is particularly advantageous. The summation circuit, however, can have some other development from that shown for purposes of illustration. In many cases a summation circuit can be suitably omitted by superimposing the two channel outputs in some other way or by deriving from them in some other way the signals for the control of the setting mechanism 27.

It is to be appreciated that various modifications and adaptations can be made in the preferred embodiments of the circuits described and illustrated herein without departing from the spirit and scope of the invention as defined in the appended claims.

That which is claimed is:

1. An electric control circuit including means which sense an air heat-related parameter for generation of signals which influence position of a control member which regulates the admixing of outside air into recirculating air in ventilation or air conditioning systems where, during winter operation, the outside air portion of the mixture, starting with a first predetermined onset point, is smaller, the lower is the air heat-related sensed parameter; and where, during summer operation, the outside air portion of the mixture, starting with a second predetermined onset point, is smaller, the higher is the air heat-related sensed parameter; said electric control circuit comprising a first channel for winter operation and a second channel for summer operation, each of said channels being constantly operational, said first channel being responsive to said sensed heat-related parameter only below said first onset point for providing a first output signal, and said second channel being responsive to said sensed heat-related parameter only above said second onset point for providing a second output signal; means responsive to the output signals from said first channel and said second channel for adjusting the position of said control member; whereby the circuit function automatically changes between winter and summer operational modes as required without aid from any special switching device.

2. An electric control circuit as defined in claim 1, wherein said means which sense an air heat-related parameter comprise means for sensing the heat-related parameter of an air mixture within said system.

3. An electric control circuit as defined in claim 1, wherein said means which sense an air heat-related parameter comprise means for sensing the heat-related parameter of outside air.

4. An electric control circuit as defined in claim 1, wherein said means which sense an air heat-related parameter comprise temperature sensing means.

5. An electric control circuit as defined in claim 4, wherein said temperature sensing means senses temperature of air mixture within said system.

6. An electric control circuit as defined in claim 4, wherein said temperature sensing means senses temperature of outside air.

7. An electric control circuit as defined in claim 2, wherein said means responsive to the output signals from said first channel and said second channel includes summation circuit means whose output signal determines the position of said control member.

8. An electric control circuit as defined in claim 1, wherein said means which sense an air heat-related parameter comprise a single, common air temperature sensor operatively associated with both said first channel and said second channel.

9. An electric control circuit as defined in claim 8, wherein said temperature sensor senses temperature of outside air.

10. An electric control circuit as defined in claim 8, wherein said temperature sensor senses temperature of air mixture within said system.

11. An electric control circuit as defined in claim 1, wherein said means which sense an air heat-related parameter comprise distinct, separate air temperature sensors in each of said channels, each channel being provided with respective rectifying means.

12. An electric control circuit as defined in claim 11, wherein each of said sensors sense temperature of outside air.

13. An electric control circuit as defined in claim 11, wherein each of said sensors sense temperature of air mixture within said system.

14. An electric control circuit as defined in claim 1, wherein said first channel is operatively arranged to provide an output signal which is zero with respect to a reference for the heat-related parameter above said first onset point, and said second channel is operatively arranged to provide an output signal which is zero with respect to said reference for the heat-related parameter below said second onset point.

15. An electric control circuit as defined in claim 14, wherein said means which sense an air heat-related parameter comprise means for sensing temperature of outside air.

16. An electric control circuit as defined in claim 14, wherein said means which sense an air heat-related parameter sense temperature of air mixture within said system.

17. An electric control circuit as defined in claim 1, further comprising means for sensing temperature of exhaust air, and means responsive to output from said means for sensing temperature, for changing automatically said second onset point in dependence on exhaust air temperature.

18. An electric control circuit as defined in claim 1, further comprising means for sensing temperature of exhaust air, and means, responsive to output from said means for sensing temperature, for changing automatically said first onset point in dependence on the exhaust air temperature.

19. An electric control circuit according to claim 1, further comprising means for limiting quantity of outlet air to a given value over a period of time.

20. An electric control circuit according to claim 19, wherein said means for limiting is operatively arranged to limit the outside air quantity to a given desired minimum value.

21. An electric control circuit according to claim 19, wherein said means for limiting is operatively arranged to limit the outside air quantity to a given desired maximum value.

22. An electric control circuit according to claim 19, wherein said means for limiting comprise a limiting circuit connected to receive output from said first channel and said second channel via summing circuit means.

23. An electric control circuit as defined in claim 1, including circuit means for adjusting slope of at least one portion of operational characteristic curve of circuit, without changing said onset points.

24. An electrical control circuit as defined in claim 1, wherein said means which sense an air heat-related parameter comprise means for sensing heat content of air.

25. An electrical control circuit as defined in claim 24, wherein said means for sensing heat content sense heat content of outside air.

26. An electrical control circuit as defined in claim 24, wherein said means for sensing heat content sense heat content of air mixture within the system.

27. An electric control circuit as defined in claim 1, including automatically operating means responsive to temperature of exhaust air for changing the onset point of variable throttling of outside air supply.

28. An electric control circuit as defined in claim 27, including means for maintaining an approximately constant difference between temperature of the exhaust air and the temperature of the outside air.

29. An electric control circuit as defined in claim 27, including means for maintaining an approximately constant difference between temperature of exhaust air and temperature of air mixture within the system.

* * * * *